United States Patent [19]
Richter

[11] 3,720,949
[45] March 13, 1973

[54] VARIABLE RESOLUTION RADAR FOR TROPOSPHERIC SOUNDERS

[75] Inventor: Juergen H. Richter, San Diego, Calif.

[73] Assignee: The United States of America as represented by the Secretary of the Navy

[22] Filed: April 6, 1970

[21] Appl. No.: 26,008

[52] U.S. Cl....................343/14, 343/5 SA, 343/5 W
[51] Int. Cl................................................G01s 9/32
[58] Field of Search............343/5 SA, 5 W, 14, 17.5

[56] References Cited

UNITED STATES PATENTS

| | | | |
|---|---|---|---|
| 2,958,865 | 11/1960 | Rabier | 343/6 R X |
| 3,273,152 | 9/1966 | Earp | 343/108 M |
| 3,191,174 | 6/1965 | Heisler et al. | 343/17.5 |
| 3,108,273 | 10/1963 | Erst | 343/14 |
| 3,039,088 | 6/1962 | Atlas | 343/5 W |
| 3,344,419 | 9/1967 | Lund | 343/5 SA |

Primary Examiner—Malcolm F. Hubler
Attorney—R. S. Sciascia, G. J. Rubens, J. W. McLaren and T. L. Styner

[57] ABSTRACT

A radar sounder for plotting and studying the refractive structure of atmospheric strata close to the ground is described. The radar comprises means for linearly modulating and vertically radiating a beam of microwave energy. The beat frequency produced in the receiver by the heterodyning of the outgoing with the returning frequencies, is a function of the elevation of the strata from which the reflections occur. Importantly, the degree of resolution of the radar of this invention can be varied from coarse to fine without altering the duty cycle or the total amount of radiated power. Coarse resolution is preferred for searching for the important principal refractive layers from ground to high altitude, while fine resolutions is necessary for examining the fine structure of the selected layer. Of extreme importance is the ability of the radar sounder of this invention to observe structures close to the ground as this is the range where refractive index variations are the greatest.

6 Claims, 7 Drawing Figures

INVENTOR.
JUERGEN H. RICHTER

INVENTOR.
JUERGEN H. RICHTER
BY
ATTORNEYS

VARIABLE RESOLUTION RADAR FOR TROPOSPHERIC SOUNDERS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

An atmospheric parameter that affects microwave radio propagation in the troposphere is the refractive index. The structure of the refractive index varies considerably in space and time. As a result of this variability microwave radio propagation is often affected in an unpredictable manner. Conventional meteorological sounding techniques like radiosonde and microwave refractometer can be performed at discrete times and places only and consequently do not provide the continuous information. A sounding technique providing the necessary continuous information is a ground based microwave radar. PreviOus attempts to sound the troposphere have used existing pulse radar. Because of the minimum range limitations of this type of radar and the difficulty to achieve high range resolution these previous sounding attempts have been of limited value. As this invention has shown, only the combination of extremely high range resolution and the ability to observe at ranges close to the ground revealed a fine scale structure in the troposphere that had not been expected and not been observed before.

OBJECTS OF THE INVENTION

The object of this invention is to provide an improved means for finding and sharply defining refractive layers in the trophosphere and for displaying fine-grain details of the entire troposphere above the point of observation.

A more specific object of this invention is to provide a radar surveillance system which is variable in resolution.

SUMMARY OF THE INVENTION

The method disclosed herein for measuring and displaying the fine scale refractive index therefore comprises the step of repetitively linearly modulating, over a given band, the frequency of a microwave generator. The FM-CW energy is vertically radiated, and reflected energy is picked up and mixed with a suitable amount of the locally generated transmitted energy to produce a beat frequency the frequency of which is a linear function of the distance to the reflecting point from which the echo was obtained. By varying the total frequency excursion, the resolution of the display can be varied from coarse to very fine. Differences in refractive layers as close as 1 meter apart can clearly be displayed according to this invention.

Other objects and features of this invention will become apparent to those skilled in the art by referring to the specific embodiment described in the following specification and illustrated in the accompanying drawings in which.

DESCRIPTION OF THE PREFERRED EMBODIMENTS

Figure 1:
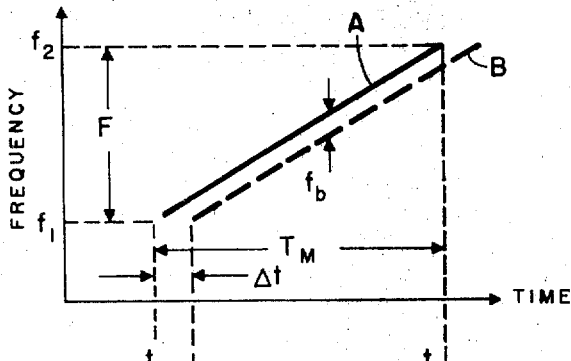
FIGS. 1 and 2 show the curves of important waves generated in prior art frequency modulation radar devices.
Figure 2:
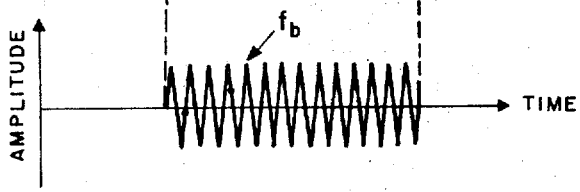

To discuss best the features of this invention, the principles of operation of frequency-modulated radar should briefly be recalled. Referring to FIG. 1, a microwave signal is linearly changed in frequency, see Line A, and is transmitted during the period $T_M$. Any reflected signal is also frequency modulated, the frequency ramp B being delayed $\Delta t$, according to the distance of the reflecting object.

These outgoing and incoming signals are mixed instantaneously which yield a difference or beat frequency $f_b$, proportional to time delay $\Delta t$, or distance. With a suitable spectrum analyzer, a spectrum of the type shown in FIG. 3 can be obtained. In case of multiple reflecting points, reflected waves will arrive at different time intervals and will cause different beat frequencies. It follows that the resolution of the system depends on the ability of the system to distinguish between adjacent frequency spectra of the type shown in FIG. 3. The amplitude of each spectrum is a measure of the reflection coefficient of each target.

As stated, range resolution means the ability to separate adjacent spectra. The minimum resolvable distance, $h$, is given by $h=c/kF$, where F is the frequency excursion or range of frequencies, from $f_1$ to $f_2$, c is the velocity of propagation, and $k$ is a constant whose value depends on the criteria used to define the separation of spectra. Resolution is dependent on the frequency excursion of the transmitted signal, and according to an important feature of this invention is varied without changing the transmitted power of the system.

Figure 4:
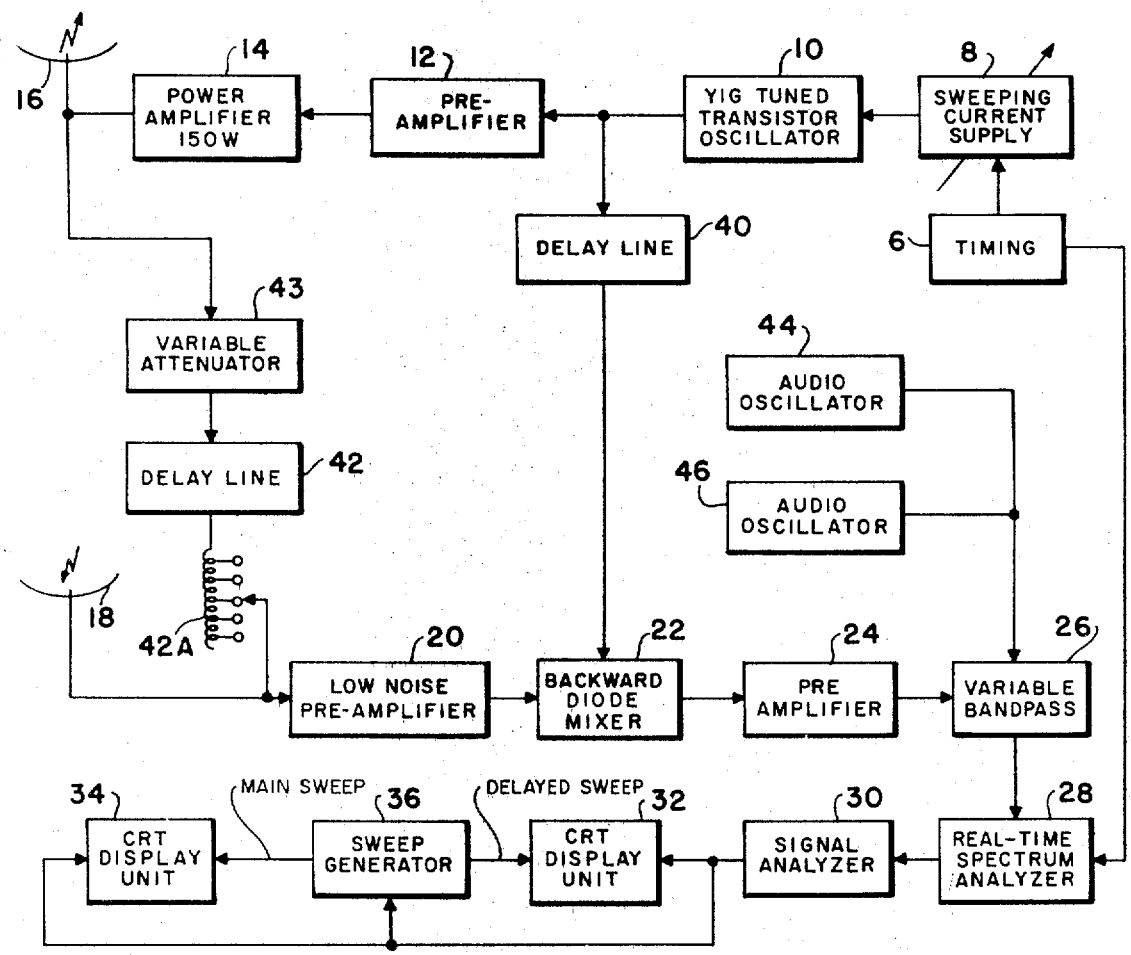
FIG. 4 is a block diagram of one radar transmitter-receiver according to this invention.

The transmitter shown in FIG. 4 comprises an oscillator 10 coupled to the pre-amplifier 12, to the power amplifier 14 and hence to the directional antenna with reflector 16. The preferred technique of modulating the frequency of the oscillator comprises a YIG sphere in the frequency determining circuit of the oscillator. This sphere composed of yttrium, iron and garnet, is particularly effective in obtaining straight line frequency change from a direct current voltage ramp. The natural frequency of the YIG sphere varies linearly with the magnetic field in which it is enclosed. The sweeping current supply 8 supplies a linearly variable magnetic field to the YIG sphere. Timing of the entire radar system including the initiation of excursions of the direct current supply is by the timing device 6. According to this invention the range of frequency F is extended or contracted at either or both ends merely by adjusting in supply 8 the length of the direct current voltage ramp applied to the frequency determining circuit of oscillator 10.

All received signals at the antenna 18 are amplified at preamplifier 20, and converted to the beat frequencies at the backward diode mixer 22. The beat frequencies are amplified at the preamplifier 24. The variable band pass filter 26 passes a selected band of the signal to the real time spectrum analyzer 28. Then a running average of the signals is achieved through digital averaging techniques in the signal analyzer 30. The signals are displayed on cathode ray tube display units 32 and 34.

Figure 3:
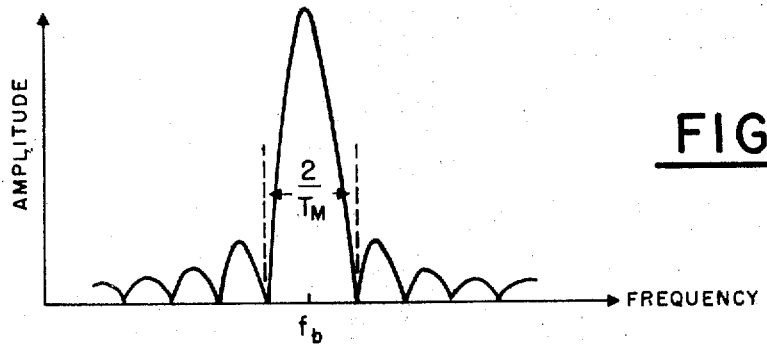
FIG. 3 is a spectrum of the beat frequency which can be found when analyzing the signal of FIG. 2.

Analysis of the spectrum of the beat frequency must be performed in real time which can be done with any real time spectrum analyzer, one of which is made generally available from the Federal Scientific Corporation, in New York, N. Y. The raw signal is sampled at a rate at least twice the highest frequency of interest and the repetitive signals are time compressed. Time compression can be effected by a glass delay line in which the output is fed back to the input of the delay line so that any signal that is fed into the delay line can be recirculated and stored indefinitely. It may take 50 milliseconds, for example, to fill the register with real-time information, this time being determined by the modulation time $T_M$, FIGS. 1 and 3. Yet all the information in the register can be read out and processed in, say, 0.10 millisecond. That is, time compression can be quite high. During $T_M$ the memory is updated and the analysis starts at the end of $T_M$ when the memory is put into "hold." The input signal was time compressed by a factor of 500 in one embodiment, when the scanning spectrum analysis was completed in 50 milliseconds. After analysis time a new modulation cycle starts, and the entire cycle of frequency sweep from $f_1$ to $f_2$, followed by storage and spectrum analysis can conveniently be repeated at a rate of 10 per second. By multiplying the output of a spectrum analyzer with a sine squared weighting function the side lobes of the sin $x/x$ spectrum, shown in FIG. 3 is suppressed, although the spectrum is somewhat broadened and the resolution bandwidth is about 30 Hz.

According to an important feature of this invention, portions of the transmitted microwave energy is fed through two paths into the receiving channel. The first path includes a delay line 40 feeding transmitted energy directly into the backward diode mixer 22. Delay line 40 is adjusted to produce a delay equal to the combined delays created by the power amplifiers and the cables to and from the antennas. That is, the delay line 40 has exactly the length or delay to produce a zero beat frequency with the signal which would be created by direct coupling the transmitting antenna 16 to the receiving antenna 18. The second path includes delay line 42 which couples part of the transmitted energy into the low noise preamplifier 20. The length of delay line 42 is carefully adjusted to equal the round trip transit time of a radar signal to a target at any arbitrary height, such as 167 meters employed in one system. The reference signal created in this matter is a check of all active components of the system and giving a continuous height calibration of the system.

According to a still further feature of this invention, discrete steps in the delay of the second path may be provided for directly measuring range resolution. Conveniently, a delay line 42A may be incorporated in or inserted in series with delay line 42, the line being provided with taps carefully spaced apart electrical distances correspond to free-space ranges for radio waves of fixed amounts, such as 1, 2, and 10 meters.

The output of the spectrum analyzer 28 is fed into the signal analyzer 30 which averages several consecutive sweeps. The number of sweeps averaged can be selected and determines the time constant introduced to the signal.

The output of the signal analyzer is applied preferably to two cathode ray tube display units 32 and 34. The horizontal sweep for the display units is provided by the sweep generator 36. A delayed sweep is applied to cathode ray tube 32 which delays the sweep with respect to the main sweep applied to CRT 34 which allows one to view simultaneously the entire analysis band and any enlarged portion thereof. One of the CRT's may be a storage scope on which the time history of the reference can be displayed as real time up to 1 hour.

The two audio oscillators 44 and 46 provide variable height markings on the display screen for readily identifying altitudes in meters or feet.

Figure 5:
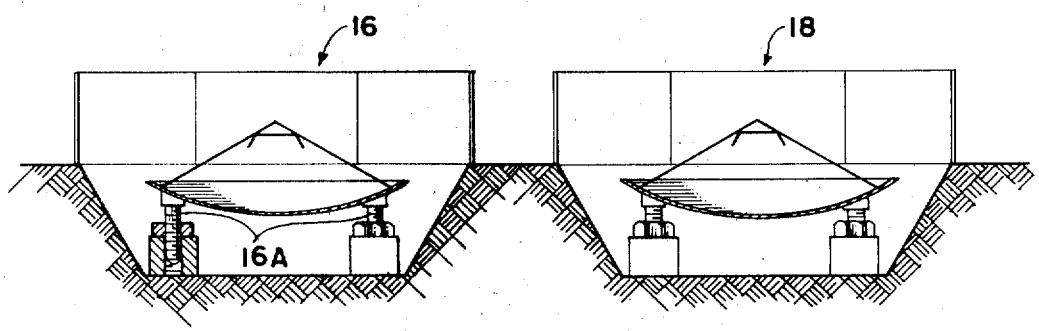
FIG. 5 is a section of the antenna system employed with the transmitter-receiver of FIG. 4.

For maximum isolation of the transmitted and received microwave energy, separate antennas should be used. In FIG. 5, for example, the antennas 16 and 18 consist of two parabolic reflectors, called "dishes," about 3 meters in diameter and 4 meters between centers. In order to achieve good isolation the antennas are located in separate pits in the ground. Metal shields around the outside of the pits and microwave absorbent at the inside increase further the isolation. The 105 db isolation, far in excess of the isolation necessary to avoid saturation of the receiver preamplifiers, was easy to attain in practice by the pit construction and the absorbing sources. The antennas must be steerable within a limited degree, such as 2.5° from vertical, in order to obviate parallax and to optimize a common volume of intersection at a given altitude. Desirably, at least one of the reflectors should be remotely tiltable with respect to the other so that the zone of intersection of the two beams can be raised or lowered. In FIG. 5 is suggested one technique where the entire antenna and reflector assembly 16 is mounted on three screw jacks 16a evenly spaced about the edge of the dish reflector. A reversible motor, not shown, can be employed to drive one or more of the screws to remotely tilt the dish, if desired. The other reflector 18 can be stationary and accurately aimed vertically, or may be supplied with a tilting mechanism. The range of motion of the reflectors from the verticle can be quite small to bring the beams into coincidence at low as well as high altitude. As stated, a range of motion of ±2.5° is ample.

Figure 6:
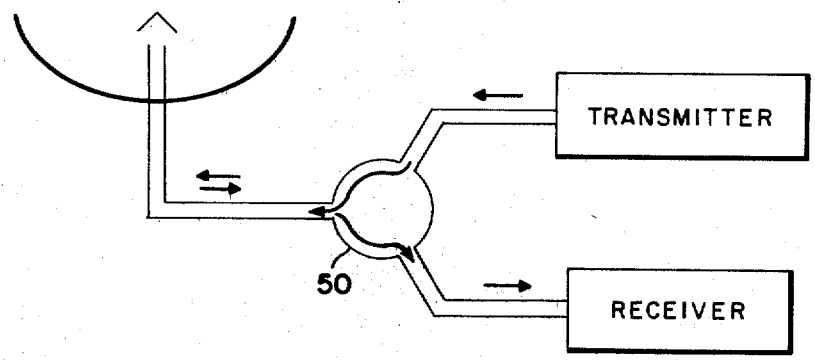
FIG. 6 is an alternative antenna system useable with the transmitter receiver of FIG. 4.

Alternatively, a single antenna and directional parabolic dish with single or cross polarized feeds may be used as shown in FIG. 6 with the circulator 54 for routing the output of the transmitter to the antenna and for routing the signals from the antenna to the receiver. This arrangement commonly provides about 25 – 40 decibels separation between the transmitted and the received signals.

The following table sets forth the parameters and performance characteristics of one specific radar system shown in FIG. 4 used for meteorological surveying according to this invention.

Table 1. Performance Characteristics of the Radar Sounder

| PARAMETER | VALUE | REMARKS |
|---|---|---|
| Power | 150 Watts | |
| Center frequency | 2.8 – 3.1 GHz | |
| Frequency excursion | variable | Linear modulation |
| Range resolution | variable | Maximum resolution 1 m for 219 MHz frequency excursion |
| Sweep duration | 50 msec | 10 sweeps per second |
| Receiver noise figure | 5 dB | |
| Minimum detectable signal | −150 dBm | |
| Antenna beam width | 2.3 degrees | |
| Isolation between antennas | 105 dB | |
| Minimum detectable cross section at 1 km | ≈3.7 × 10$^{-4}$ sq. cm. | |
| Minimum detectable reflectivity at 1 km | ≈4.2 × 10$^{-8}$ cm$^{-1}$ | for 1 m range resolution |

It is apparent, of course, that many ranges of frequencies may be employed within the capabilities of the components used. The restriction to 2.9 gigahertz was determined by the standing wave ratio, SWR, of the antenna feed and the balanced mixer.

As stated, the variable range resolution is an important feature of this invention. In the case of volume scattering the signal amplitude changes continuously with the resolution thereby permitting significant conclusions to be drawn. The maximum range resolution of about 1 meter was determined experimentally. The spectra of two targets 93 centimeters apart were separable using a frequency excursion F of 219 megahertz in 50 milliseconds. Insects with a cross-sectional area of 10-3 square centimeters can cause dot echoes 24 db above noise at a height of 1 kilometer.

Figure 7:
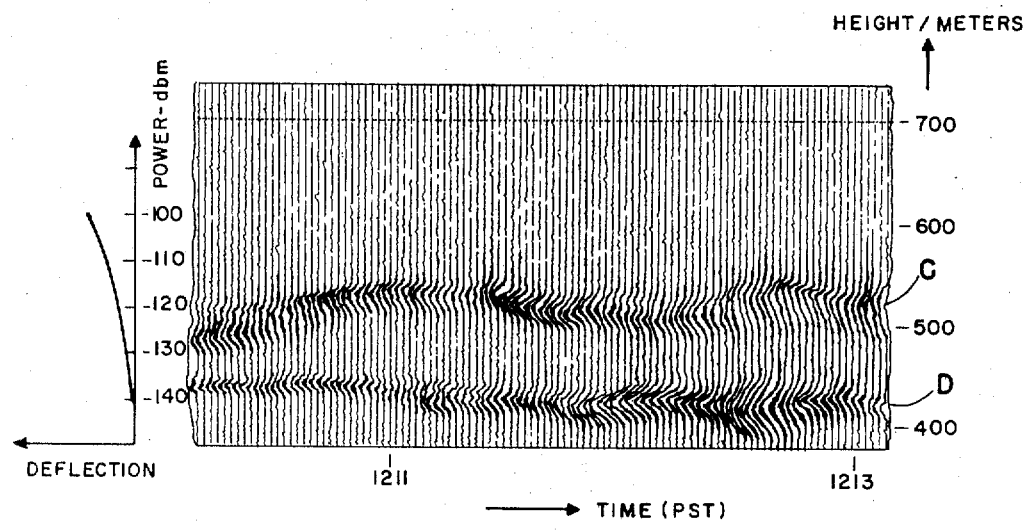
FIG. 7 is an example of an A-I (Amplitude-Intensity) presentation on the scope of the receiver of FIG. 4.

FIG. 7 illustrates the combined amplitude intensity display recorded on an expanded time basis. Each vertical trace on the recording is a running average of the signal on the previous 32 frequency sweeps with an exponential eighting function and a time constant of 3.2 seconds every 16th trace is displayed so that the record shows 37.5 sweeps per minute. In this way the signal amplitudes can be read quantitatively using the power-deflection chart of FIG. 7 without overlap of adjacent traces. By using the signals themselves to provide simultaneous intensity modulation the record is shaded so that the brightest echoes are also the strongest. The fine structure of the refractive layers and their intensity can be obtained with the amplitude-intensity display, which is especially valuable for meteorological forecasting.

Close examination of FIG. 7 indicates that there are two distinct refractive layers C and D. The bottom layer thickens progressively with time from about 5 meters at the start, not shown, to a maximum of about 35 meters 4 minutes later at about 1,213 hours, Pacific Standard Time. The apparent broadening of the stratum just after 1,212 PST appears to be due to a jump in the layer height. Careful scrutiny shows that a single refractive layer occasionally had two well-defined intensity peaks separated vertically 5 to 10 meters.

It is clear that the FM radar above disclosed has an excellent capability for detecting the fine scale refractivity inhomogeneities which occur at atmospheric interfaces showing sharp refractivity gradients or changes in gradient. Not only can the entire troposphere be simultaneously displayed for a good perspective but the high resolution of the radar permits examination of minute details of the strata.

Obviously many modifications and variations of the present invention are possible in the light of the above teachings. It is therefore to be understood that within the scope of the appended claims the invention may be practiced otherwise than as specifically described.

What is claimed is:

1. In measuring and displaying the altitude and details of strata of distinct refractive indices of the troposphere, the method comprising the steps of:
   generating continuous microwave energy;
   repetitively linearly modulating the frequency of the microwave energy;
   vertically radiating from a directional antenna a relatively narrow beam of said microwave energy;
   focusing and vertically fixedly directing directional receiving antenna means to substantially the same space illuminated by the radiated beam to receive any microwave energy reflected vertically downward from overhead atmospheric strata;
   combining outgoing and reflected energy in a low flicker noise mixer to generate beat frequencies which instantaneously are functions of the altitude of said reflecting strata;
   displaying said beat frequencies in terms of altitude; and
   varying the range of frequencies of said microwave energy for varying the resolution of the display.

2. In combination in a system for displaying a cross section of the refractive strata of the troposphere, said system comprising:
   a microwave generator with a frequency determining circuit;
   a frequency determining means having a resonant frequency which, over a predetermined range, is a linear function of a variable direct current;
   a sweep current supply for generating a succession of straight-line voltage ramps;
   means for applying said voltage ramps to said frequency determining means for linearly varying the microwave frequency of said generator;
   stationary antenna means for forming a relatively narrow beam, said antenna means being disposed to aim vertically said beam,;
   plural cascaded amplifier stages coupling the output of said generator to said antenna means;
   a low flicker noise mixer of microwave frequencies;
   plural cascaded stages coupling the receiver terminal of said antenna means to one input of said mixer, the other input of said mixer being coupled to the output of said generator for combining outgoing and incoming microwave energy for generating beat frequencies; and
   display means for showing said beat frequencies, said display showing said beat frequencies in terms of the vertical height of atmospheric strata from which said energy is reflected.

3. The combination defined in claim 2 comprising further:
   a delay line coupled in the circuit between the output of said generator and said mixer, the amount of delay being adjusted to approximately equal the total delays of all amplifiers and signal circuitry between said generator, said antenna means and said mixer.

4. The combination defined in claim 2 further comprising:
means for selectively varying the length of said ramps for varying at will the excursions of the frequency of said microwave generator to alter the resolution of said system.

5. The combination defined in claim 2 further comprising:
an adjustable delay line coupled between the transmitter terminal and the receiver terminal of said antenna means, the amount of said delay being adjustable to amounts corresponding to predetermined altitude-ranges.

6. In the combination defined in claim 2, said antenna means comprising:
two side-by-side parabolic reflectors disposed in side-by-side excavations in the ground with the geometric axis of each being fixed substantially vertically;
support means spaced about the periphery of said reflector, and
means for vertically adjusting at least one of said supports of one reflector for tilting the axis of said one reflector toward or away from axis of the other reflector.

* * * * *